(12) United States Patent
Cazals et al.

(10) Patent No.: US 10,597,135 B2
(45) Date of Patent: Mar. 24, 2020

(54) AIRCRAFT CELL COMPRISING A DOOR OPENING IN RECTILINEAR TRANSLATION

(71) Applicant: Airbus Operations SAS, Toulouse (FR)

(72) Inventors: Olivier Cazals, Blagnac (FR); Jaime Genty De La Sagne, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 466 days.

(21) Appl. No.: 15/385,379

(22) Filed: Dec. 20, 2016

(65) Prior Publication Data

US 2017/0183077 A1    Jun. 29, 2017

(30) Foreign Application Priority Data

Dec. 23, 2015   (FR) ...................................... 15 63248

(51) Int. Cl.
| | | |
|---|---|---|
| B64C 1/14 | (2006.01) | |
| B64C 1/22 | (2006.01) | |
| B64C 39/10 | (2006.01) | |
| B64C 1/00 | (2006.01) | |

(52) U.S. Cl.
CPC .......... *B64C 1/1438* (2013.01); *B64C 1/1415* (2013.01); *B64C 1/22* (2013.01); *B64C 39/10* (2013.01); *B64C 2001/0045* (2013.01); *B64C 2039/105* (2013.01); *Y02T 50/12* (2013.01)

(58) Field of Classification Search
CPC ... B64C 1/1415; B64C 1/1438; B64C 1/1407; B64C 1/22; B64C 2001/0045; B64C 2039/105; B64C 39/10; B64F 1/30; B64F 1/32; B64D 209/00; E05D 15/10; E05Y 2099/502; E05Y 2099/531
See application file for complete search history.

(56) References Cited

U.S. PATENT DOCUMENTS

| | | | | |
|---|---|---|---|---|
| 2,345,512 | A * | 3/1944 | Treptow | B61D 19/005 105/424 |
| 2,445,131 | A * | 7/1948 | Wartian | B64C 1/1407 244/129.5 |
| 2,519,386 | A * | 8/1950 | Loving | B64C 1/32 244/129.5 |
| 3,131,892 | A * | 5/1964 | Salmun | B64C 1/14 244/129.5 |
| 3,869,102 | A * | 3/1975 | Carroll | B64C 39/02 244/118.1 |
| 3,927,709 | A * | 12/1975 | Anderson | E05D 15/24 160/116 |

(Continued)

OTHER PUBLICATIONS

French Search Report, dated Oct. 10, 2016, priority document.

*Primary Examiner* — Medhat Badawi
(74) *Attorney, Agent, or Firm* — Greer, Burns & Crain, Ltd.

(57) ABSTRACT

In order to simplify the connection of a door to the outer envelope of an aircraft cell, it is provided to dispose the door into a portion of the outer envelope having tilted sides, as is the case at the nose cones and the tail cones of conventional airplanes, and in various portions of blended wing body airplanes and flying wings. Thus, the door can be configured to displace, in rectilinear translation, from one of its extreme opening and closing positions to the other, without requiring that the door protrudes outside of the outer envelope in the closing position.

10 Claims, 6 Drawing Sheets

(56) References Cited

U.S. PATENT DOCUMENTS

| | | | | |
|---|---|---|---|---|
| 4,125,235 A * | 11/1978 | Fitzgerald | ................ | B64C 1/143 244/129.5 |
| 4,176,812 A * | 12/1979 | Baker | ................... | B64C 1/1407 182/77 |
| 4,375,876 A * | 3/1983 | Stewart | ................ | B64C 1/1438 160/201 |
| 4,470,566 A * | 9/1984 | Fitzgerald | ............ | B64C 1/1407 244/129.1 |
| 4,635,883 A * | 1/1987 | Hamilton | ................ | B64D 9/00 244/137.1 |
| 5,064,147 A * | 11/1991 | Noble | .................. | B64C 1/1407 244/129.5 |
| 5,181,677 A * | 1/1993 | Kaplan | ................ | B64C 1/1438 244/129.4 |
| 5,259,576 A * | 11/1993 | Howard | ............... | B64C 1/1438 244/129.4 |
| 5,303,508 A * | 4/1994 | Porte | .................... | B64C 1/1446 123/41.04 |
| 6,109,563 A * | 8/2000 | Verhoeven | ............. | B64C 1/143 244/129.5 |
| 6,189,833 B1 * | 2/2001 | Ambrose | ............. | B64C 1/1407 244/118.3 |
| 6,345,786 B1 * | 2/2002 | Sakurai | .................. | B64C 25/16 244/100 R |
| 6,352,221 B1 * | 3/2002 | Sakurai | .................. | B64C 25/16 244/102 R |
| 7,275,717 B2 * | 10/2007 | Landry | ................ | B64C 1/1415 244/129.5 |
| 7,290,736 B2 * | 11/2007 | Pahl | ..................... | B64C 1/1407 244/129.5 |
| 7,744,035 B2 * | 6/2010 | Saint-Jalmes | ........ | B64D 11/003 244/118.5 |
| 8,070,102 B2 * | 12/2011 | Kobayashi | ............ | B64C 1/1438 244/129.4 |
| 8,740,148 B2 * | 6/2014 | Risch | ................... | B64C 1/1461 244/129.5 |
| 8,833,700 B2 * | 9/2014 | Klaas | ................... | B64C 1/1407 244/129.4 |
| 9,567,059 B2 * | 2/2017 | Scimone | ............... | B64C 1/1407 |
| 9,592,902 B2 * | 3/2017 | Perkins | ................ | B64C 1/1423 |
| 9,708,051 B2 * | 7/2017 | Voss | ........................ | B64C 1/066 |
| 9,957,045 B1 * | 5/2018 | Daly | ....................... | B64C 37/02 |
| 2005/0133667 A1 * | 6/2005 | Pahl | ..................... | B64C 1/1407 244/129.5 |
| 2008/0217475 A1 * | 9/2008 | Allison | ................ | B64D 11/00 244/114 R |
| 2009/0173825 A1 * | 7/2009 | Dehn | .................... | B64C 1/1438 244/129.5 |
| 2010/0059628 A1 * | 3/2010 | Kobayashi | ............ | B64C 1/1438 244/129.5 |
| 2011/0036941 A1 * | 2/2011 | Cazals | ...................... | B64C 3/38 244/46 |
| 2014/0175215 A1 * | 6/2014 | Gallant | ................... | B64D 11/00 244/36 |
| 2015/0108275 A1 * | 4/2015 | Pothier | ................... | E05B 77/36 244/129.5 |
| 2016/0245006 A1 * | 8/2016 | Joussellin | ........... | E05D 15/0621 |
| 2017/0043857 A1 * | 2/2017 | Seibt | ..................... | B64C 1/1407 |
| 2017/0183077 A1 * | 6/2017 | Cazals | .................. | B64C 1/1415 |

* cited by examiner

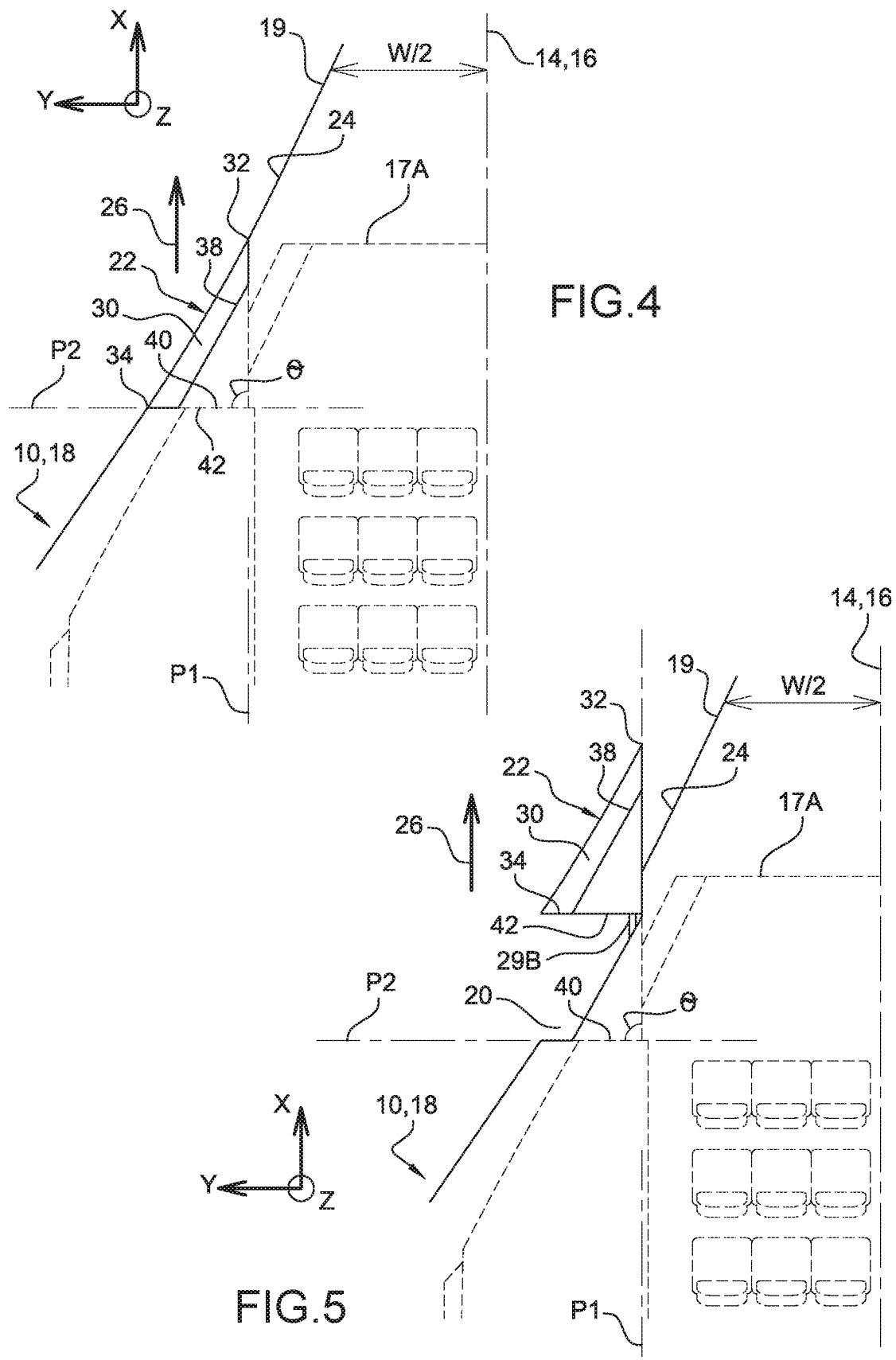

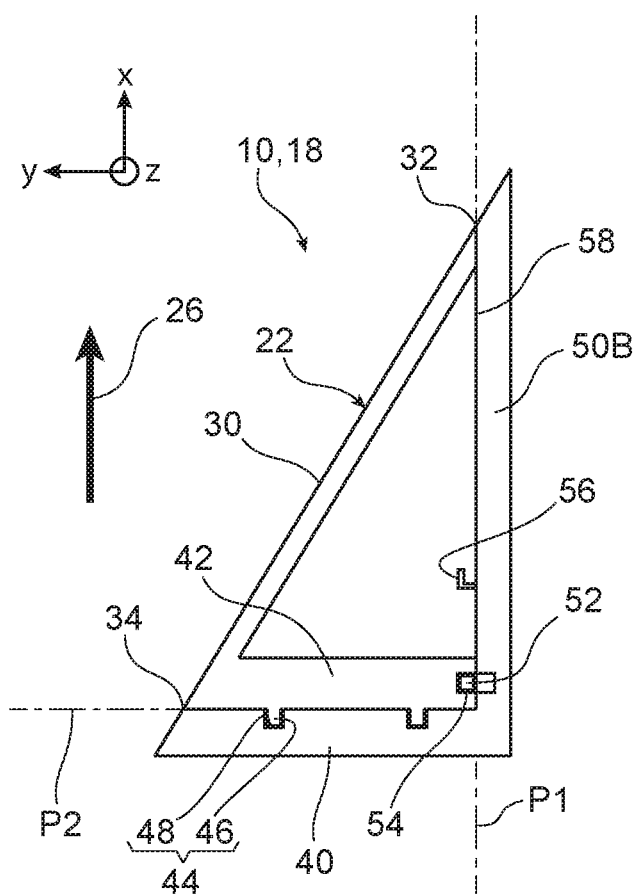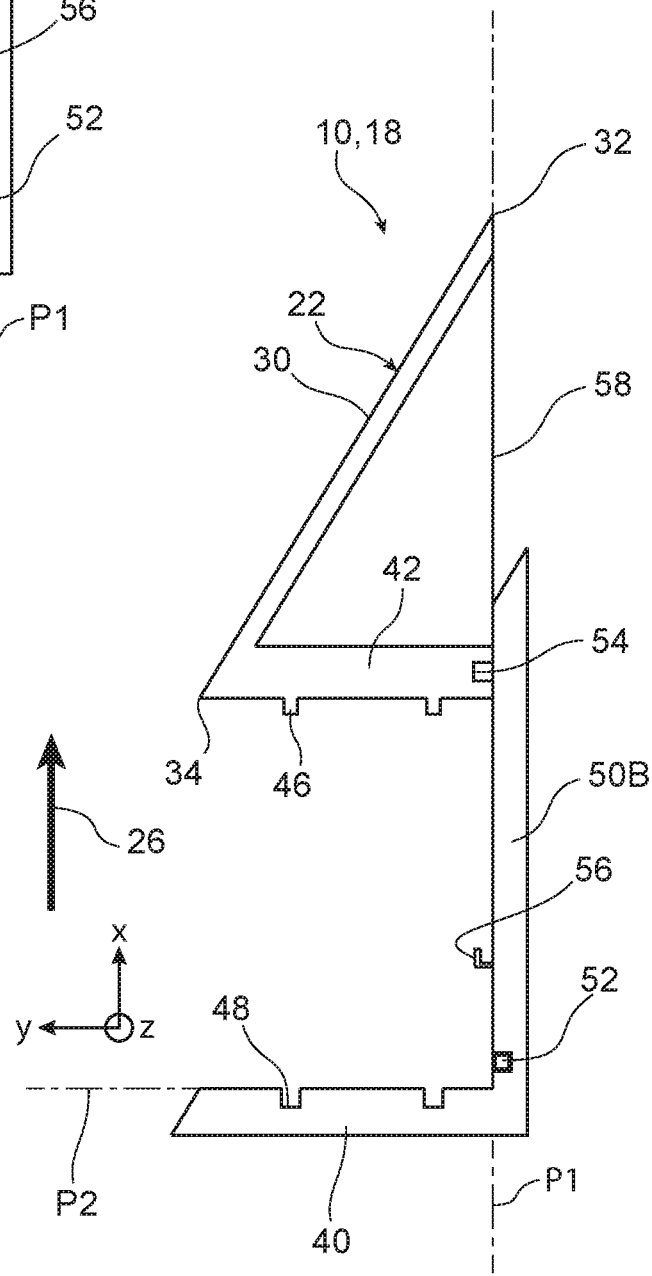

AIRCRAFT CELL COMPRISING A DOOR OPENING IN RECTILINEAR TRANSLATION

CROSS-REFERENCES TO RELATED APPLICATIONS

This application claims the benefit of the French patent application No. 1563248 filed on Dec. 23, 2015, the entire disclosures of which are incorporated herein by way of reference.

TECHNICAL FIELD

This invention relates to the field of aircraft doors which allow access for passengers or the loading of baggage or goods.

The invention applies to both aircraft of the conventional type and aircraft of the "blended wing body" type, in which the doors are incorporated in the fuselage, and flying wings, in which the doors are incorporated into the wing.

As is known by the skilled person, an aircraft of the "flying wing" type the aircraft has no fuselage. In an aircraft of the "blended wing body" type there is no clear distinction between the fuselage and the wings as in a conventional aircraft. The fuselage and the wings each contribute to the bearing capacity of the aircraft. In the aircraft there is continuity in the wing box between the fuselage and each of the wings. In both these cases the aircraft has zones intended for the transport of passengers (pax) or goods (cargo), or both combined.

As a consequence, the invention relates in general to an aircraft cell comprising an external envelope provided with a door, the external envelope being therefore the fuselage of a conventional aircraft or a blended wing body aircraft, or the wing of a flying wing.

BACKGROUND OF THE INVENTION

Various types of mechanisms for connecting an aircraft door to the outer envelope of an aircraft cell are known.

Such doors can, in fact, open by pivoting downwards or upwards, in which case specific means, which are generally heavy, must be provided in order to overcome the weight of the door, either as it is being closed or to keep the door in the open position. Doors of this type are used in many conventional aircraft, and they are also common in flying wings and blended wing body aircraft, such as the aircraft 10 illustrated diagrammatically in FIGS. 1A and 1B, in which the aircraft is seen from above and below respectively, and which thus comprises three doors 12 on each side of its vertical plane of symmetry 14. As a reminder, blended wing body (or BWB) aircraft are aircraft whose cells incorporate the characteristics of conventional fuselages and flying wings in a hybrid configuration in which the fuselage is completely incorporated into the wing, which is as a consequence thick, without any clear distinction of the connecting portion between the fuselage and the wing.

In other known configurations, the door opens by moving horizontally, in which case the opening mechanism generally involves a combination of rotational and translational movements, or several rotations about different axes, in order to avoid the need for the door to protrude outside from the aircraft cell envelope in its closed position.

In every case, the aircraft door opening mechanisms are relatively complex and heavy.

SUMMARY OF THE INVENTION

An object of the invention is, in particular, to provide a simple, economical and effective solution for this problem.

For this purpose, it provides an aircraft cell comprising:
an outer envelope having at least one longitudinal portion, the width of which reduces in a longitudinal direction of the aircraft cell, provided with at least one opening made in the longitudinal portion,
a door, and
linking means connecting the door to the outer envelope, configured to move the door between two extreme positions, namely, a closed position in which the door obstructs the opening, and an open position in which the door is offset horizontally from the opening in such a way that the door covers a region of the outer envelope adjacent to the opening.

In accordance with the invention, the linking means are configured in such a way that movement of the door from one to other of the two extreme positions is a rectilinear translational movement in one direction of movement.

The variable width conformation of the longitudinal portion of the outer envelope, in fact, makes it possible to configure an opening perimeter such that when the door is in the closed position, the perimeter of the opening does not intercept any straight line parallel to the direction of movement passing through any point in the door.

Thus, the door can move from the closed position to the open position and vice versa following a single rectilinear path, without being blocked by the perimeter of the opening in the outer envelope.

The nature of the path followed by the door between its two extreme positions makes it possible to use particularly simple linking means. The invention, thus, in particular, makes it possible to avoid resort to complex articulated devices using combinations of rotational and translational movements.

Preferably, the aircraft cell has one overall vertical plane of symmetry.

Preferably, the direction of movement is a horizontal direction parallel to the overall vertical plane of symmetry.

Preferably, the door has an outer surface that is included in the longitudinal portion of the outer envelope in the closed position and has a first lateral edge extending in a first plane parallel to the overall vertical plane of symmetry and a second lateral edge arranged in such a way that movement of the door from the closed position to the open position is orientated in a direction going from the second lateral edge towards the first lateral edge.

Preferably, the outer surface of the door also has a lower edge and an upper edge, each of which connect the first lateral edge to the second lateral edge.

Preferably, the second lateral edge extends in a second plane forming an angle of between 60 degrees and 120 degrees with the first plane.

Preferably, the second plane is at right angles to the direction of movement.

Preferably, the aircraft cell further comprises a first supporting structure extending into the aircraft cell from the outer envelope, parallel to the second plane, the door has a second supporting structure extending into the aircraft cell from the second lateral edge parallel to the second plane, and the second supporting structure bears against the first supporting structure in the closed position.

Preferably, the first and second supporting structures comprise at least a first blocking device which prevents the door from moving in a first direction at right angles to the first plane.

Preferably, the aircraft cell further comprises at least one support extending into the aircraft cell from the first supporting structure and parallel to the direction of movement, to which at least part of the linking means is attached.

Preferably, the aircraft cell further comprises at least one lock which can be moved between a locked condition in which the lock prevents the door from being moved in the direction of movement, and an unlocked condition in which the lock allows the door to be moved.

Preferably, the linking means are formed of one or more slides guiding movement of the door between the closed position and the open position.

BRIEF DESCRIPTION OF THE DRAWINGS

The invention will better understood, and other details, advantages and characteristics thereof will be apparent from a reading of the following description provided by way of a non-limiting example with reference to the appended drawings in which:

FIGS. 4 and 5 are partial diagrammatical half-views from above of the fore part of the cell of a blended wing body aircraft in FIG. 3, illustrating the door in closed and open positions respectively;

FIGS. 8 and 9 are partial diagrammatical half-views of the fore part of the blended wing body aircraft cell in FIG. 3, in cross-section along the horizontal plane VIII-VIII in FIGS. 6 and 7, illustrating the door in the closed and open positions respectively.

In all the figures the same reference numbers identify identical or similar components.

DETAILED DESCRIPTION OF THE PREFERRED EMBODIMENTS

Figure 1A:
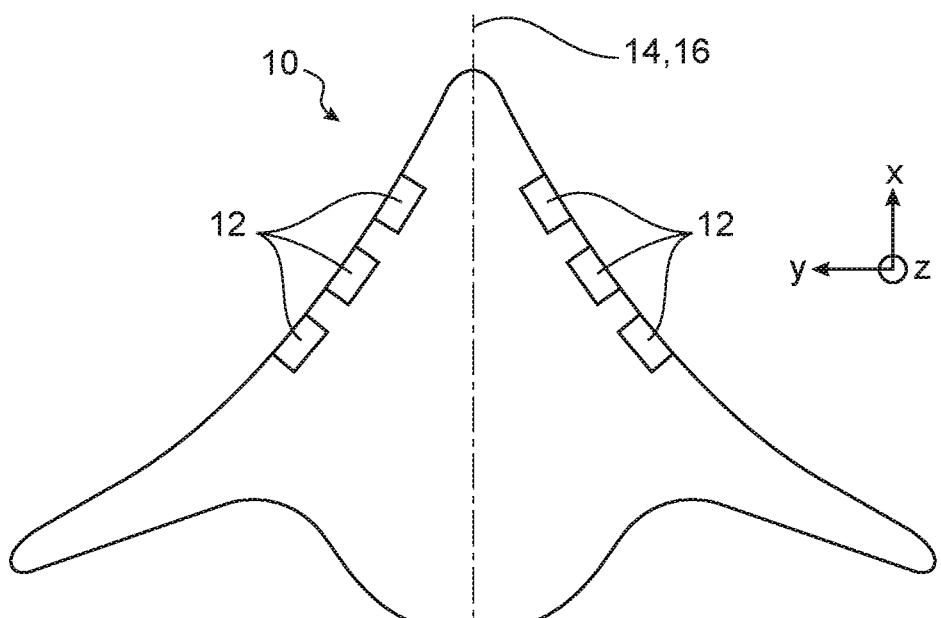
FIGS. 1A and 1B, already described, are diagrammatical views of a cell of a blended wing body aircraft of a known type, from above and below respectively.
Figure 1B:
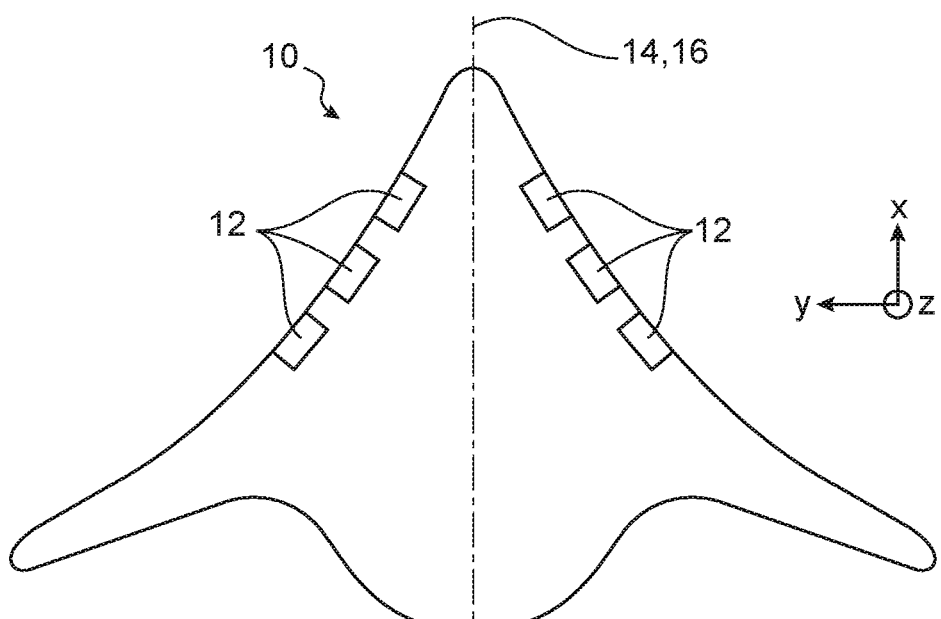

The invention provides for making use of the inclination of the outer envelope of an aircraft cell in relation to its overall vertical plane of symmetry to offer an improved configuration for an aircraft door. Such inclination of the outer envelope is, in fact, found in the nose and tail portions of conventional aircraft, and in various portions of blended wing body aircraft and flying wings. The term "outer envelope" may therefore refer to the fuselage and/or wing of an aircraft according to circumstances.

By way of example, an aircraft cell 10 illustrated in FIGS. 2 to 9 is a cell of a blended wing body aircraft having an overall vertical plane of symmetry 14. The term "overall" plane of symmetry should be understood to mean that the outer envelope of the cell has an overall symmetrical shape in relation to that vertical plane, independently of any differences of detail which may be present between one side and the other of the outer envelope, for example as regards the number and conformation of the doors. Furthermore, the aircraft cell 10 has a longitudinal axis 16 defined as being the intersection between the overall vertical plane of symmetry 14 and a main floor 17 of the cell, which is intended for the use of passengers and/or cargo.

In this description, the X direction is the longitudinal direction of the aircraft cell, corresponding to the direction of travel of the aircraft when in flight, and is parallel to the longitudinal axis 16, the Z direction is the vertical direction at right angles to the main floor 17A, and the Y direction is the transverse direction at right angles to the two X and Z directions, thus defining a horizontal plane with longitudinal axis 16.

FIGS. 3-7 show more particularly a fore part of aircraft cell 10, the outer envelope of which comprises a longitudinal portion 18, the width W whereof reduces progressively in a rearward direction along longitudinal axis 16 (see half-width W/2 in FIG. 4). Consequently, in the view from above as in FIGS. 4 and 5, sides 19 of longitudinal portion 18 of the aircraft cell are inclined in relation to the overall vertical plane of symmetry 14.

Figure 2:
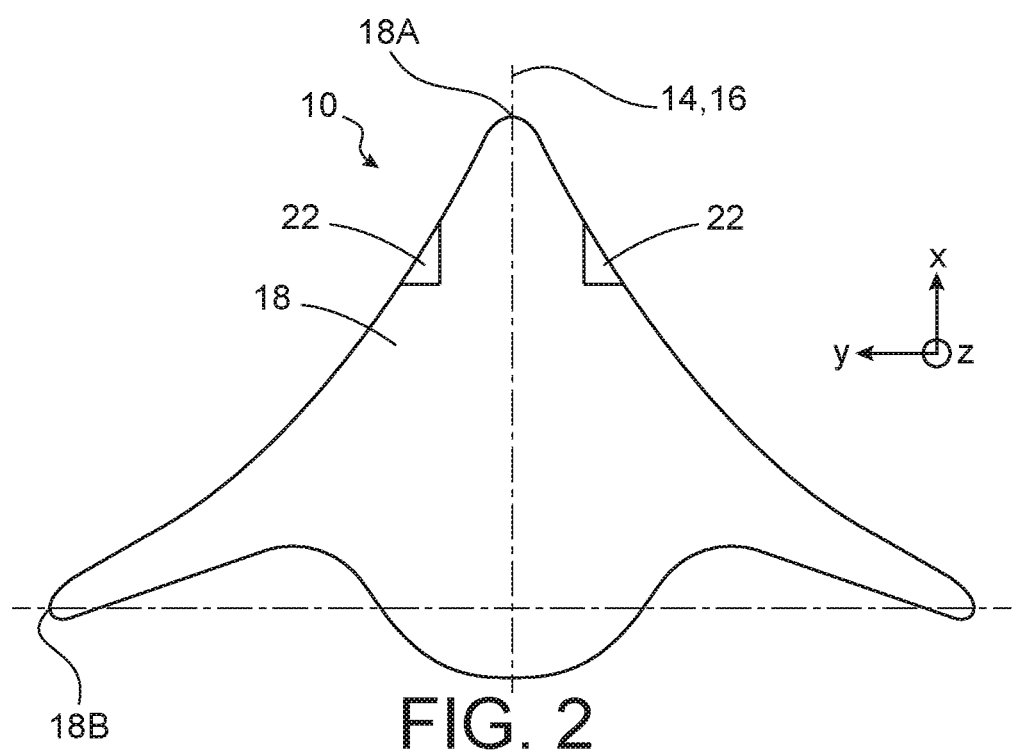
FIG. 2 is a diagrammatical view from above of a cell of a blended wing body aircraft according to a preferred embodiment of the invention.

As shown in FIG. 2, the longitudinal portion 18 has a forward extremity 18A corresponding to the forward extremity of the aircraft cell and a rear extremity 18B defined as being a zone of the outer envelope of the aircraft cell from which the width of that outer envelope reduces or remains constant in a rearward direction.

In general, it should also be understood that the width W of the longitudinal portion 18 of the outer envelope reduces from one of forward extremity 18A or rear extremity 18B to the other extremity 18B or 18A.

In addition to this, the longitudinal portion 18 of the outer envelope has an opening 20 intended to allow passengers to pass or baggage or cargo to be loaded/unloaded.

Aircraft cell 10 further comprises a door 22 which can be moved between a closed position (FIGS. 4, 6 and 8) in which the door obstructs the opening 20 and an open position (FIGS. 3, 5, 7, 9) in which the door 22 is horizontally offset from the opening 20 in such a way that the door covers a region 24 of the outer envelope located alongside the opening 20. In its open position, the door 22 is thus offset from the opening 20 in such a way as to allow persons, baggage and/or cargo to pass through the opening.

According to one particular feature of the invention the movement of the door 22 from the closed position to the open position is one of rectilinear translation in a direction of movement 26.

The variable width conformation of the longitudinal portion 18, in fact, makes it possible to configure a perimeter for the opening 20 such that when the door is in the closed position, the perimeter intercepts no straight line parallel to the direction of movement 26 passing through any point in the door.

Thus, the door 22 can pass from the closed position to the open position and vice versa by following a single rectilinear path, without being blocked by the perimeter of opening 20.

Figure 3:
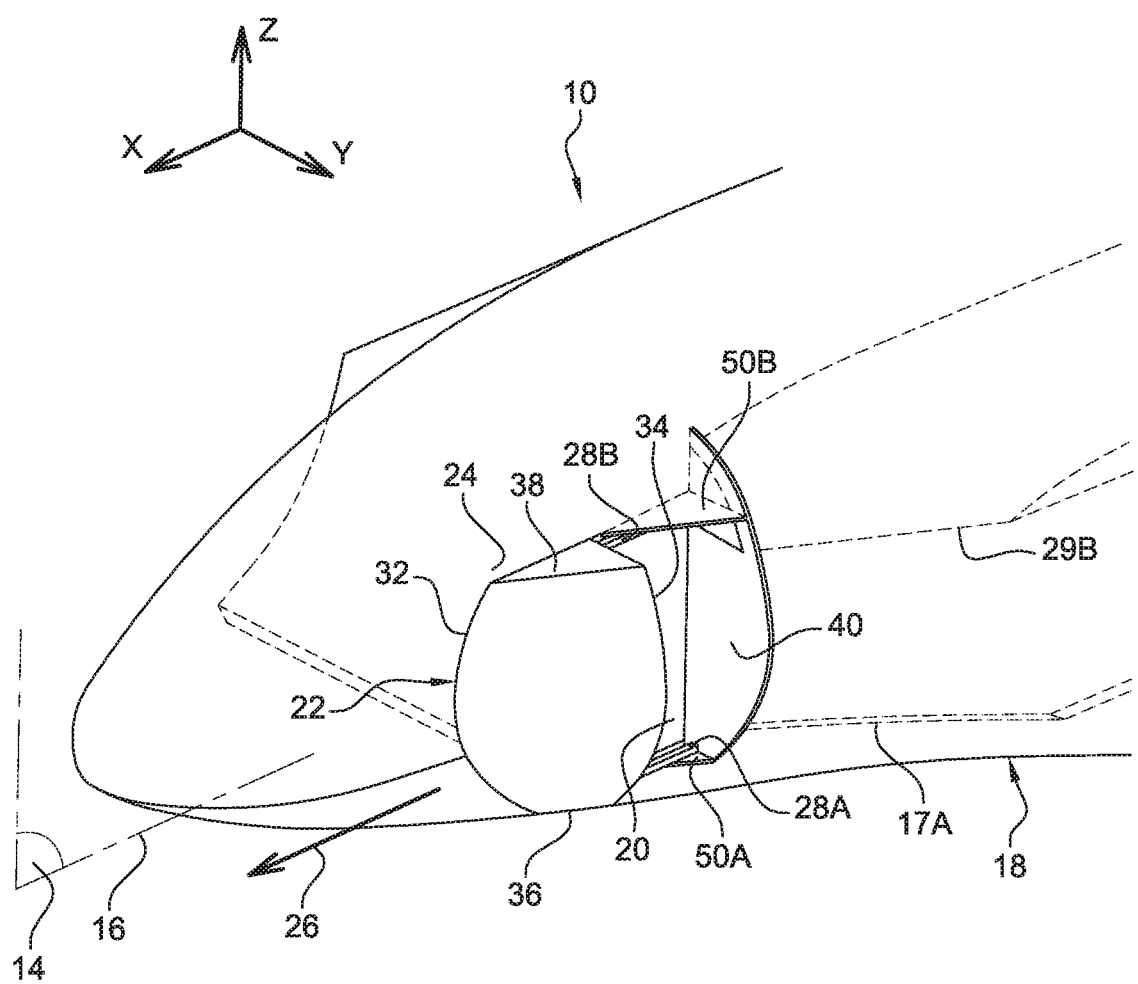
FIG. 3 is a diagrammatical perspective view of a fore part of the cell of a blended wing body aircraft in FIG. 2, illustrating a door in this fore part.
Figure 6:
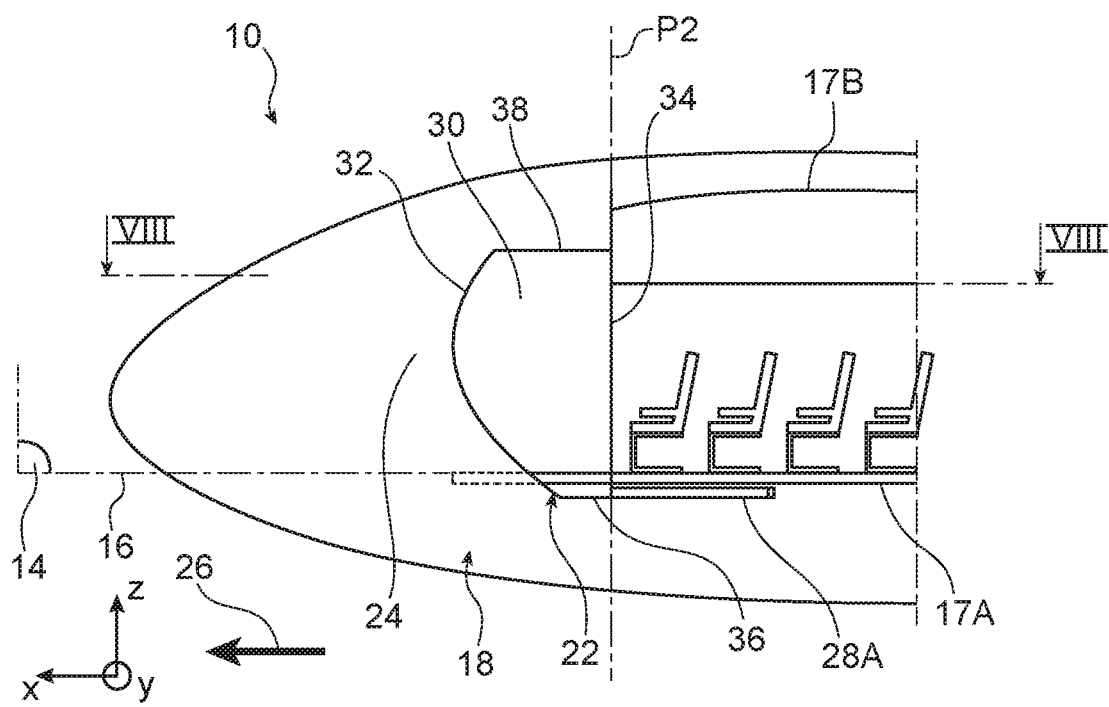
FIGS. 6 and 7 are lateral diagrammatical views of the fore part of the cell of a blended wing body aircraft in FIG. 3, from the outside and inside respectively.
Figure 7:
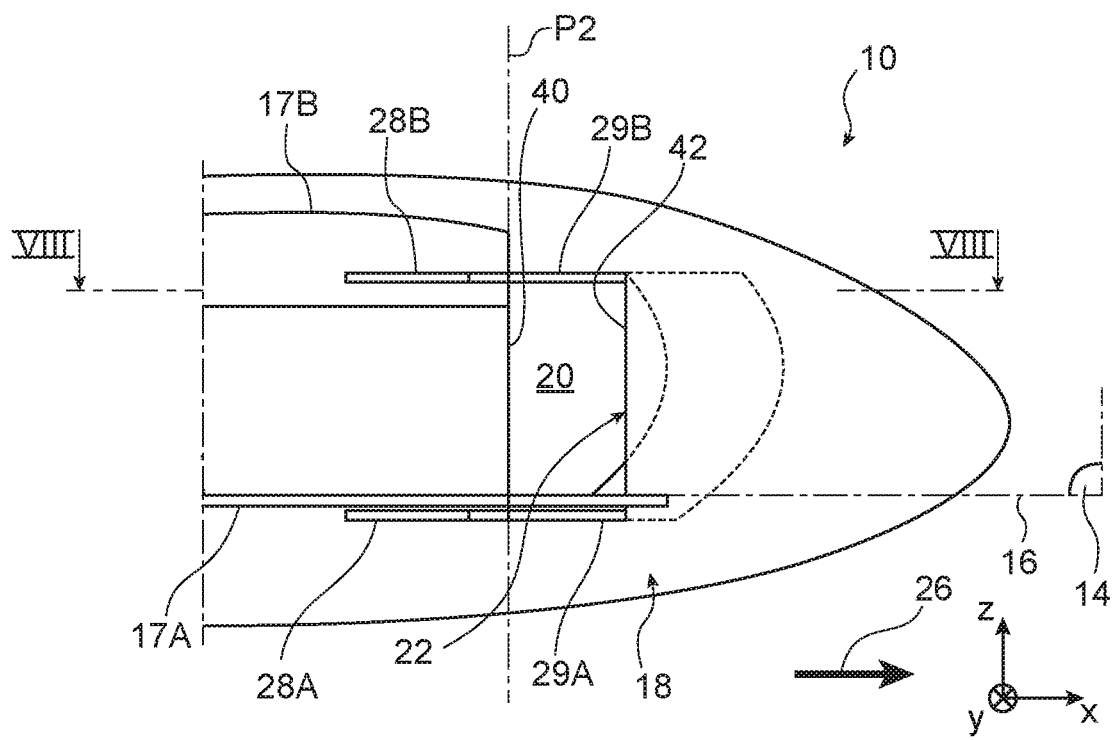

The door 22 is connected to the outer structure by linking means which, for example, comprise two slides 28A and 28B of one piece with the outer envelope which guide the movement of two slide members 29A, 29B respectively, which are of one piece with the door, between the door's open and closed positions (FIGS. 3 and 7).

As a variant, the linking means may be formed of articulated arms or any other kind of mechanism, which will allow the door 22 to move in rectilinear translation.

Furthermore, the slide 28A is, for example, housed in a space located below the floor 17A of the cell, whereas the slide 28B is, for example, housed in an upper housing 17B (FIG. 7).

In a preferred embodiment of the invention, the direction of movement 26 is a horizontal direction parallel to the overall vertical plane of symmetry 14, that is to say, a direction substantially parallel to the longitudinal axis 26 (FIGS. 3-7).

The horizontal nature of the direction of movement 26, in particular, makes it possible to avoid movement of the door being disturbed by its weight and, thus, to avoid resorting to relatively complex and heavy means normally used to overcome such disturbance.

The characteristic that the direction of movement 26 is parallel to the overall vertical plane of symmetry 14 offers many advantages which will be detailed below.

As a variant, the direction of movement 26 may nevertheless be orientated otherwise without going beyond the scope of the present invention, through adapting the shape of the opening 20. Thus, the direction of movement 26 may be a horizontal direction inclined in relation to the overall vertical plane of symmetry 14, or even a direction at right angles to the overall vertical plane of symmetry 14, which may, in particular, be advantageous when the sides of the longitudinal portion 18 form a relatively large angle with the overall vertical plane of symmetry 14. The direction of the movement 26 may also not be horizontal, without going beyond the scope of the invention.

In any event, the rectilinear path followed by the door 22 between its two extreme positions makes it possible to use particularly simple linking means. The invention, thus, in particular, makes it possible to avoid resort to complex articulation devices involving several rotations or a combination of rotational and translational movements.

At the same time, the invention makes it possible for the door 22 to have an outer surface 30 incorporated into a longitudinal portion 18 of the outer envelope when the door is in the closed position, as shown on FIG. 4.

This outer surface 30 has two opposite lateral edges, namely a first lateral edge 32 and a second lateral edge 34. In the terminology of the invention, movement of the door from the closed position to the open position is orientated in a direction going from the second lateral edge 34 towards the first lateral edge 32 (that is to say, strictly speaking, a direction going from a barycenter of the second lateral edge 34 towards a barycenter of the first lateral edge 32).

Thus, in the example illustrated, movement of the door 22 from the closed position to the open position is orientated towards the front of the aircraft cell, such that the first lateral edge 32 is a forward edge, whereas the second lateral edge 34 is an after edge.

The configuration of the door 22 is compatible with the use of cover plates or other sealing systems, on the first lateral edge 32, in particular.

In the preferred embodiment of the invention, the first lateral edge 32 extends in a first plane P1 parallel to the overall vertical plane of symmetry 14.

The orientation of the first plane P1 parallel to the overall vertical plane of symmetry 14 offers advantages with regard to the aerodynamic performance of the aircraft cell 10. This is particularly so when the aircraft cell is a cell of a blended wing body aircraft or flying wing, because the airflow around the outer envelope of aircraft of these types follows lines extending in planes parallel to their overall vertical plane of symmetry following the profile of the outer envelope.

As a consequence, positioning the first lateral edge 32 of the door in a plane parallel to the overall vertical plane of symmetry 14 makes it possible to minimize the impact of the first lateral edge on the aerodynamic performance of the aircraft cell 10, in particular in the situation where the opening 20 is formed in a leading edge, in the example illustrated in the figures. This, in particular, makes it possible to minimize the risks of creating turbulence at this location, which is known to increase the drag of the aircraft cell, even if there is an interstitial portion between the outer surface 30 of the door and the outer envelope of the aircraft cell, or if these two surfaces are not in perfect alignment. Such a configuration of the first lateral edge 32 thus makes it possible to reduce the drag of aircraft cell 10. Furthermore, turbulence of this type is also generally the origin of noise nuisance, such that the preferred embodiment of the invention makes it possible to limit the level of such nuisance noise close to the aircraft cell, in particular, for passengers and crew members inside the aircraft.

When in flight, the aircraft cell is subject to bird strikes. As it is not formed of one piece with the outer envelope, a conventional aircraft door is particularly sensitive to such strikes. Now the orientation of the first lateral edge 32 makes it possible to reduce the effect of bird strikes on this lateral edge, and as a consequence to increase the robustness of the aircraft cell of the invention with regard to these strikes.

In the example illustrated, the outer surface of the door also has a lower edge 36 and an upper edge 38, which each connect the first lateral edge 32 to the second lateral edge 34.

This lower edge 36 and upper edge 38 extend in respective directions which are inclined in relation to the overall vertical plane of symmetry 14 of the aircraft cell (FIG. 3).

As a variant, the first lateral edge 32 and the second lateral edge 34 may be directly connected to each other.

Furthermore, in the preferred embodiment of the invention, the second lateral edge 34 extends in a second plane P2 forming an angle θ of between 60 degrees and 120 degrees with first plane P1 (FIGS. 4 and 5).

In the preferred example illustrated, this angle θ is substantially equal to 90 degrees. The second plane P2 is thus at right angles to the direction of movement 26.

Thus, in the situation where the aircraft cell is a cell of a blended wing body aircraft or flying wing, the second lateral edge 34 extends substantially at right angles to the flow of air around the outer envelope.

Furthermore, the aircraft cell 10 comprises a first supporting structure 40 extending into the aircraft cell from the outer envelope parallel to the second plane P2 and the door 22 has a second supporting structure 42 extending into the aircraft cell from the second lateral edge 34 parallel to the second plane P2 (FIGS. 4, 5, 8 and 9).

As shown in FIGS. 4 and 8, the second supporting structure 42 bears against the first supporting structure 40 when the door 22 is in the closed position.

The orientation of the bearing structures 40 and 42, corresponding to the orientation of the second plane P2 within which the second lateral edge 34 lies, allows the aerodynamic forces applied to the door 22 during flight, which are mainly orientated in the longitudinal X direction, to be taken up in an optimum way, especially in the case of a cell of a blended wing body aircraft or a cell of a flying wing.

In the example illustrated, the supporting structures 40 and 42 are flat overall and respectively take the shape of two supporting plates.

In the preferred embodiment of the invention, the two slides 28A and 28B are respectively attached to two parts of the perimeter of the opening 20, namely a lower part 50A and an upper part 50B, extending from the first supporting structure 40, respectively opposite the lower surface 36 and the upper surface 38 of the outer surface 30 of the door 22 inside aircraft cell 10 (FIG. 3).

Furthermore, the first and second supporting structures 40 and 42 comprise first blocking devices 44 (FIGS. 8 and 9) which prevent the door from moving in a first direction at right angles to the first point P1 when the door 22 is in the closed position. In the example illustrated, the first direction corresponds to the transverse Y direction.

The first blocking devices 44 comprise, for example, locking pins or bolts 46 of one piece with the second supporting structure 42 which engage in matching housings 48 formed in the first supporting structure 40. Other types of locking devices which are in themselves known may be used without going beyond the scope of the invention.

Furthermore, the perimeter of the door advantageously comprises second locking devices 56 (FIGS. 8 and 9) preventing the door from moving in the vertical Z direction when the door 22 is in the closed position. These second locking devices, for example, take the form of hooks formed in the lower part 50A and the upper part 50B respectively of the perimeter of the opening 20, and engage in notches provided for the purpose in an inner wall 58 of the door 22 (only one of these hooks may be seen in FIGS. 8 and 9).

The aircraft cell 10 further comprises one or more locks 52 (FIGS. 8 and 9). Each of these locks 52 can be maneuvered when the door 22 is in the closed position to pass from the locked condition in which a part of the lock 52 engages a housing 54 formed in the door 22, for example in the second supporting structure 42, to an unlocked condition in which the part of the lock 52 is disengaged from the housing 54. In the locked condition, the lock 52 thus immobilizes the door 22 in the direction of movement 26, while in the unlocked condition the lock 52 allows the door 22 to be opened.

Other immobilization and/or locking means may, of course, be provided without going beyond the scope of the present invention.

It should be noted that in the embodiment illustrated, the door 22 comprises two inner walls connected to each other and connected to the first lateral edge 32 and the second lateral edge 34, respectively, namely the aforesaid inner wall 58, and the second supporting structure 42 which forms the second inner wall.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft cell, comprising:
an outer envelope having at least one longitudinal portion, a width of the longitudinal portion reduces in a longitudinal direction of the aircraft cell, the outer envelope provided with at least one opening made in the said at least one longitudinal portion,
a door, and
a linking means connecting the door to the outer envelope and configured to move the door between two extreme positions, namely a closed position wherein the door obstructs the opening, and an open position wherein the door is horizontally offset from the opening in such a way that the door covers a region of the outer envelope adjacent to the opening,
wherein the linking means is configured in such a way that movement of the door from one of the two extreme positions to the other is a rectilinear translational movement in one direction of movement,
wherein the linking means is located inside the aircraft cell,
wherein the door moves from the closed position to the open position and vice versa following a single rectilinear path without being blocked by a perimeter of the opening in the outer envelope, and
wherein the width of the longitudinal portion reduces in a longitudinal direction of the aircraft cell from one of a forward extremity and a rear extremity of the longitudinal portion to the other of the forward extremity and the rear extremity of the longitudinal portion.

2. The aircraft cell as claimed in claim 1, wherein the aircraft cell has one overall vertical plane of symmetry.

3. The aircraft cell as claimed in claim 2, wherein the one direction of movement is a horizontal direction parallel to the overall vertical plane of symmetry.

4. The aircraft cell as claimed in claim 2, wherein the door has an outer surface included in the at least one longitudinal portion of the outer envelope when in the closed position, and has a first lateral edge extending in a first plane parallel to the overall vertical plane of symmetry and a second lateral edge arranged in such a way that movement of the door from the closed position to the open position is orientated in a direction going from the second lateral edge towards the first lateral edge.

5. The aircraft cell as claimed in claim 4, wherein the outer surface of the door has a lower edge and an upper edge which each connect the first lateral edge to the second lateral edge.

6. The aircraft cell as claimed in claim 4, wherein the second lateral edge extends in a second plane forming an angle of between 60 degrees and 120 degrees with the first plane.

7. The aircraft cell as claimed in claim 6, wherein the second plane is orthogonal to the direction of movement.

8. The aircraft cell as claimed in claim 6, further comprising a first supporting structure extending into the aircraft cell from the outer envelope, parallel to the second plane,
wherein the door has a second supporting structure extending into the aircraft cell from the second lateral edge, parallel to the second plane,
wherein the second supporting structure bears against the first supporting structure in the closed position, and
wherein the first and second supporting structures comprise at least one first blocking device preventing the door from moving in a first direction orthogonal to the first plane.

9. The aircraft cell as claimed in claim 8, further comprising at least one of an upper or a lower part extending into the aircraft cell from the first supporting structure, parallel to the one direction of movement, wherein at least part of the linking means is attached to the at least one of the upper or the lower part.

10. The aircraft cell as claimed in claim 9, further comprising at least one lock which is movable between a locked condition in which the lock prevents the door from moving in the direction of movement, and an unlocked condition in which the lock allows a door movement.

\* \* \* \* \*